United States Patent
Wu et al.

(10) Patent No.: US 11,292,317 B2
(45) Date of Patent: Apr. 5, 2022

(54) MULTI-DIRECTIONAL SMOOTH DAMPER AND CIRCULAR AIR CONDITIONER VENT

(71) Applicant: CHINATOOL MOULD SYSTEMS CO., LTD., Guangdong (CN)

(72) Inventors: Wenke Wu, Guangdong (CN); Xialin Tan, Guangdong (CN)

(73) Assignee: CHINATOOL MOULD SYSTEMS CO., LTD., Shenzhen (CN)

( * ) Notice: Subject to any disclaimer, the term of this patent is extended or adjusted under 35 U.S.C. 154(b) by 222 days.

(21) Appl. No.: 16/395,285

(22) Filed: Apr. 26, 2019

(65) Prior Publication Data

US 2019/0248214 A1    Aug. 15, 2019

Related U.S. Application Data

(63) Continuation of application No. PCT/CN2017/095359, filed on Aug. 1, 2017.

(30) Foreign Application Priority Data

May 9, 2017 (CN) .......................... 201710322739.8

(51) Int. Cl.
  *B60H 1/34* (2006.01)
  *F16D 3/44* (2006.01)
  *F16D 3/205* (2006.01)

(52) U.S. Cl.
  CPC .............. *B60H 1/3414* (2013.01); *F16D 3/44* (2013.01); *B60H 2001/3471* (2013.01); *B60H 2001/3478* (2013.01); *F16D 3/2052* (2013.01)

(58) Field of Classification Search
  CPC .......... B60H 1/3414; B60H 2001/3478; B60H 2001/3471; B60H 1/3442; F16C 33/102;
  (Continued)

(56) References Cited

U.S. PATENT DOCUMENTS

| 1,491,763 A * | 4/1924 | Warhus ...................... F16D 3/44 464/120 |
| 2010/0004064 A1* | 1/2010 | Hu ............................ F16D 3/20 464/112 |

(Continued)

FOREIGN PATENT DOCUMENTS

| CN | 204268667 U | 4/2015 | |
| DE | 102009009241 A1 * | 8/2010 | ........... B60H 1/3442 |

(Continued)

OTHER PUBLICATIONS

Extended European Search Report of counterpart European Patent Application No. 17909193.9 dated Jan. 14, 2021.

*Primary Examiner* — Steven B McAllister
*Assistant Examiner* — Charles R Brawner

(57) ABSTRACT

A multi-directional smooth damper includes a base including an inner cavity, two ends of the inner cavity defining openings, a first rotating portion, and a second rotating portion. A first end of the first rotating portion is rotated and disposed in the inner cavity of the base and a shape of the first end of the first rotating portion corresponds to a shape of the inner cavity. A second end of the first rotating portion passes through an opening of one end of the base. The first rotating portion is disposed at one end of the base having the opening and the inner cavity. A first end of the second rotating portion is rotated and disposed in an inner cavity of the first rotating portion. A grease layer is coated between a surface of the first rotating portion and the surface of the inner cavity of the base.

13 Claims, 5 Drawing Sheets

(58) Field of Classification Search
CPC .......... F24F 13/1426; F16D 3/26; F16D 3/44;
F16D 3/2052
USPC .......................... 454/154; 464/112, 120, 151
See application file for complete search history.

(56) References Cited

U.S. PATENT DOCUMENTS

| | | | |
|---|---|---|---|
| 2013/0022388 A1* | 1/2013 | Carli | B62D 7/18 |
| | | | 403/39 |
| 2013/0210333 A1 | 8/2013 | Kober et al. | |
| 2015/0202946 A1* | 7/2015 | Inagaki | B60H 1/3442 |
| | | | 454/154 |
| 2016/0089959 A1* | 3/2016 | Bouldron | B60H 1/3421 |
| | | | 454/155 |
| 2016/0137034 A1* | 5/2016 | Sano | B60H 1/3442 |
| | | | 454/154 |
| 2017/0130767 A1* | 5/2017 | Parker, Jr | F16C 11/069 |

FOREIGN PATENT DOCUMENTS

| | | |
|---|---|---|
| JP | 2007106360 A | 4/2007 |
| JP | 2016118284 A | 6/2016 |

\* cited by examiner

A - A

B - B

MULTI-DIRECTIONAL SMOOTH DAMPER AND CIRCULAR AIR CONDITIONER VENT

CROSS REFERENCE TO RELATED APPLICATIONS

The present application is a Continuation Application of PCT Application No. PCT/CN2017/095359 filed on Aug. 1, 2017, which claims the benefit of Chinese Patent Application No. 201710322739.8 filed on May 9, 2017. All of the above are hereby incorporated by reference.

TECHNICAL FIELD

The present disclosure relates to a field of an air conditioner technology, and in particular to a circular air conditioner vent.

BACKGROUND

In an automobile air conditioner field, adjustment of an air conditioner vent includes adjusting an air volume switch and adjusting air direction. Adjusting the air volume switch of a square vent mainly controls a switch of the square vent via an external dial wheel, thereby adjusting the air volume. The air direction of the square vent is adjusted by adjusting a vertical direction of blades and horizontal direction of the blades.

However, a circular vent does not have the dial wheel and a vent control structure, the adjustment of the air volume switch of the circular vent is realized through a closed-vent structure arranged on an external surface of the circular vent. Since the circular vent does not have vertical and horizontal blades, the adjustment of the air direction is realized by an overall rotation of an inner housing. Since the air direction should be maintained via friction between the internal and external housing after adjustment, mostly the internal housing directly contacts the external housing, and operating force depends on adjusting a size of the internal housing and a size of the external housing, and the friction between the plastic internal and the plastic housing external housing brings noise and not smooth operation.

Another method for adjusting the air direction is to realize the adjustment of the air direction by matching an elastic convex structure with a latch. Although the method is more comfortable, a process for matching the elastic convex structure with the latch brings a "tak tak" sound that makes users feel aversion.

Furthermore, for the circuit vent in the market, in order to integrate the air direction adjustment and the adjustment of the air volume switch in one, the circular vent on the prior art mainly through the universal ball joint and is realized by adding a panel rotation button. A common universal ball joint includes a bearing sleeve and a ball head disposed in the bearing sleeve. In this universal ball joint, the operating force for blade deflection is controlled by the clamping in the ball head disposed in the bearing sleeve. That is, friction resistance between the bearing sleeve and the ball head is adjusted by corresponding pre-tightening of the bearing sleeve around the ball head. Since wear of used material and the weakening of elasticity is caused by aging, retention force of the universal ball joint decreases over time. Namely the retention force of the blade is less and less until the air guide device in the housing no longer has sufficient support to maintain a preset direction for airflow. In an extreme case, there is a gap is between the bearing sleeve and the ball head, which results in an unexpected noise in the car and changes in the size of the ball head and housing caused by the temperature change, further making operating force not smooth or no operating force.

The above-mentioned method needs to add the panel rotation button to control the structure of a vent switch and pass the operating force to the vent through wheel gear, thereby, to turn on and off vent. That is, the smooth of operation force depends on high precision size, transmission nodes are too many, and the problem risk is multiplied.

At present, a common damping device of the air conditioner vent of car which technical requirements for smooth operating force mainly realized by a coordination control of shaft and shaft hole. The above technology requires precise size control and is tested repeatedly for different products to meet the requirements. This structure is not conducive to form a smooth and constant damping force from the cooperation of the rotating shaft and shaft hole. Most circular vent for integrating of the air direction adjustment and the adjustment of the air volume switch in one, the structure is complex, the installation is very inconvenient, the operation cannot be smooth.

Thereby, it is necessary to develop a novel air conditioner vent with a simple structure, smooth operation, and stable damping force to overcome existing problems in the prior art.

SUMMARY

In view of the above problems mentioned in the prior art, the present disclosure provides a multi-directional smooth damper and a circular air conditioner vent to overcome the above problem.

The embodiment of the present disclosure provides a multi-directional smooth damper, including a base including an inner cavity that is spherically-shaped, a first rotating portion, and a second rotating portion. The two ends of the inner cavity defining openings. A first end of the first rotating portion is rotated and disposed in the inner cavity of the base and a shape of the first end of the first rotating portion corresponds to a shape of the inner cavity. A second end of the first rotating portion passes through an opening of one end of the base. The first rotating portion is disposed at one end of the base having the opening and the inner cavity. A first end of the second rotating portion is rotated and disposed in an inner cavity of the first rotating portion and a shape of the inner cavity of the first rotating portion corresponds to the shape of the inner cavity. A second end of the second rotating portion passes through the opening of one end of the base away from the first rotating portion. At least one grease groove is disposed on a surface of the inner cavity of the base, and a grease layer is coated between a surface of the first rotating portion and the surface of the inner cavity of the base.

Furthermore, the grease groove is formed from the opening of one end of the base along the surface of the inner cavity of the base to extend to an opening of the other end of the base.

Furthermore, the first rotating portion comprises a first ball and a first operating shaft; an end of the first operating shaft is connected with the first ball. The first ball is rotated and disposed in the inner cavity of the base. The first operating shaft passes through the opening of the one end of the base. The first ball comprises an opening and an inner cavity. The second rotating portion comprises a second ball and a second operating shaft, and an end of the second operating shaft is connected to the second ball. The second ball is rotated and disposed in the inner cavity of the first rotating portion, and the second operating shaft passes through the opening of the end of the base away from the first rotating portion.

Furthermore, an annular protrusion and a second connecting piece are disposed on the second operating shaft. A second connecting piece is connected with the annular protrusion and is connected to an external component.

Furthermore, an ear column is disposed on the second ball of the second rotating portion and the ear column drives the second rotating portion to rotate around axis. An ear column avoidance groove is disposed in the inner cavity of the rotating portion and is matched with the ear column; the first rotating portion drives the second rotating portion to rotate synchronously around the axis via matching the ear column with the ear column avoidance groove.

Furthermore, the ear column is a columnar projection distributed in the second ball in the non-rotational axis direction.

Furthermore, the base comprises an end cover having a through hole and sealingly connected with the opening of one end of the base. The base comprises a base body with a stepped and a convex shape. A sinking platform is disposed on the end cover, and is buckled and connected to a convex plate disposed on one end of the base body. The openings of two ends of the base have sealing rings to seal grease.

The present disclosure provides a circular air conditioner vent, where the circular air conditioner vent comprises a housing, a blade disposed in the housing, an air door, and a multi-directional smooth damper comprising an inner cavity, a first rotating portion, and a second rotating portion. The inner cavity of the base is spherically-shaped, two ends of the inner cavity defining openings. A first end of the first rotating portion is rotated and disposed in the inner cavity of the base and a shape of the first end of the first rotating portion corresponds to a shape of the inner cavity. A second end of the first rotating portion passes through an opening of one end of the base. The first rotating portion is disposed at one end of the base having the opening and the inner cavity. A first end of the second rotating portion is rotated and disposed in an inner cavity of the first rotating portion and a shape of the inner cavity of the first rotating portion corresponds to the shape of the inner cavity. A second end of the second rotating portion passes through the opening of one end of the base away from the first rotating portion. At least one grease groove is disposed on a surface of the inner cavity of the base, and a grease layer is coated between a surface of the first rotating portion and the surface of the inner cavity of the base. A base of the multi-directional smooth damper is fixed and connected with an inner surface of the housing; the blade is circular and connected with a first rotating portion of the multi-directional smooth damper. The air door is rotated and connected with the housing by the multi-directional smooth damper.

Furthermore, the circular air conditioner vent further comprises a connecting rod shaft connected with the second operating shaft of the multi-directional smooth damper and a bevel gear connected with the connecting rod shaft. The bevel gear is meshed with the semi-bevel gear disposed on the air door.

Furthermore, the air door comprises a rotating shaft and two air door bodies disposed on the rotating shaft. The two air door bodies are unfolded in a shape corresponding to the opening of the one end of the housing away from the blade. The semi-bevel gear is staggered and disposed on position of the rotating shaft corresponding to two air door bodies.

Furthermore, the grease groove is formed from the opening of one end of the base along the surface of the inner cavity of the base to extend to an opening of the other end of the base.

Furthermore, the first rotating portion comprises a first ball and a first operating shaft. An end of the first operating shaft is connected with the first ball; the first ball is rotated and disposed in the inner cavity of the base. The first operating shaft passes through the opening of the one end of the base. The first ball comprises an opening and an inner cavity. The second rotating portion comprises a second ball and a second operating shaft, and an end of the second operating shaft is connected to the second ball. The second ball is rotated and disposed in the inner cavity of the first rotating portion. The second operating shaft passes through the opening of the end of the base away from the first rotating portion.

Furthermore, an annular protrusion and a second connecting piece are disposed on the first operating shaft. A second connecting piece is connected with the annular protrusion and is connected to an external component.

Furthermore, an ear column is disposed on the second ball of the second rotating portion and the ear column drives the second rotating portion to rotate around axis. An ear column avoidance groove is disposed in the inner cavity of the rotating portion and is matched with the ear column. The first rotating portion drives the second rotating portion to rotate synchronously around the axis via matching the ear column with the ear column avoidance groove.

From the above technical scheme, the present disclosure uses the multi-directional smooth damper to uniformly adjust an air volume switch and air direction of the circular air conditioner vent, which simplifies structure, saves operating space, and simplifies operation. When the first rotating portion rotates in the inner cavity of the base, a grease layer is coated between an external surface of the first rotating portion and the inner cavity of the base, which performs lubrication action and keeps constant damper force because of viscosity of the grease. The structure is simple, which is convenient to assemble and achieves smooth rotation and keeps stable retention force. When the structure does not change, different grease is coated, the damper force is also different.

BRIEF DESCRIPTION OF DRAWINGS

In order to clearly explain embodiment of the present disclosure or technical scheme of the prior art. The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor.

DETAILED DESCRIPTION

A technical proposal in the embodiments of the present disclosure is clearly and completely described in the following with reference to the drawings and embodiments. Obviously, the described embodiments are only a part of the embodiments of the present disclosure, but not all embodiments. All other embodiments obtained by those skilled in the art based on the embodiments of the present disclosure without creative efforts are within the scope of the present disclosure.

Embodiment 1

Figure 1:
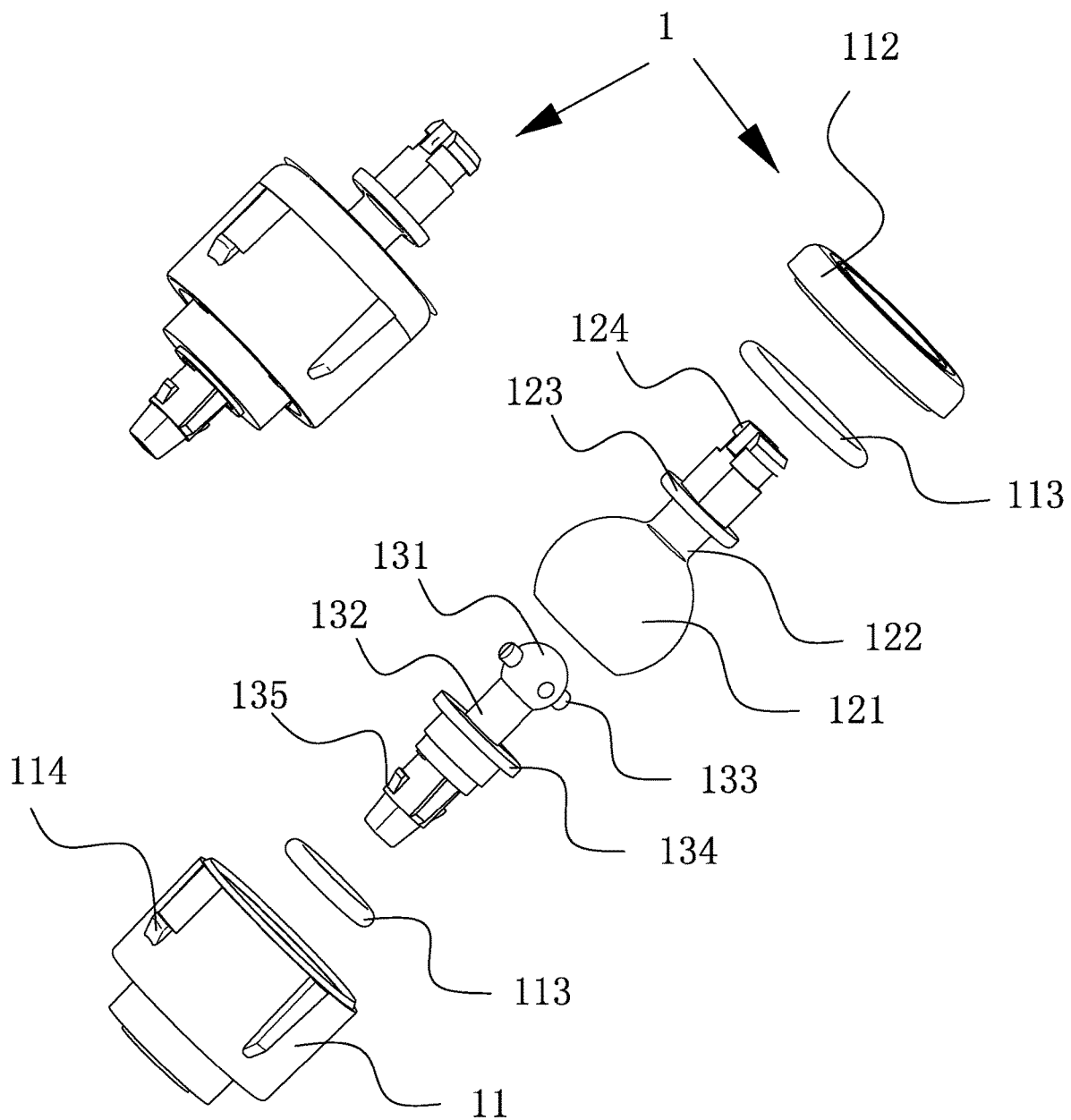
FIG. 1 is a structural schematic diagram and exploded schematic diagram of a multi-directional smooth damper of the present disclosure.
Figure 2:
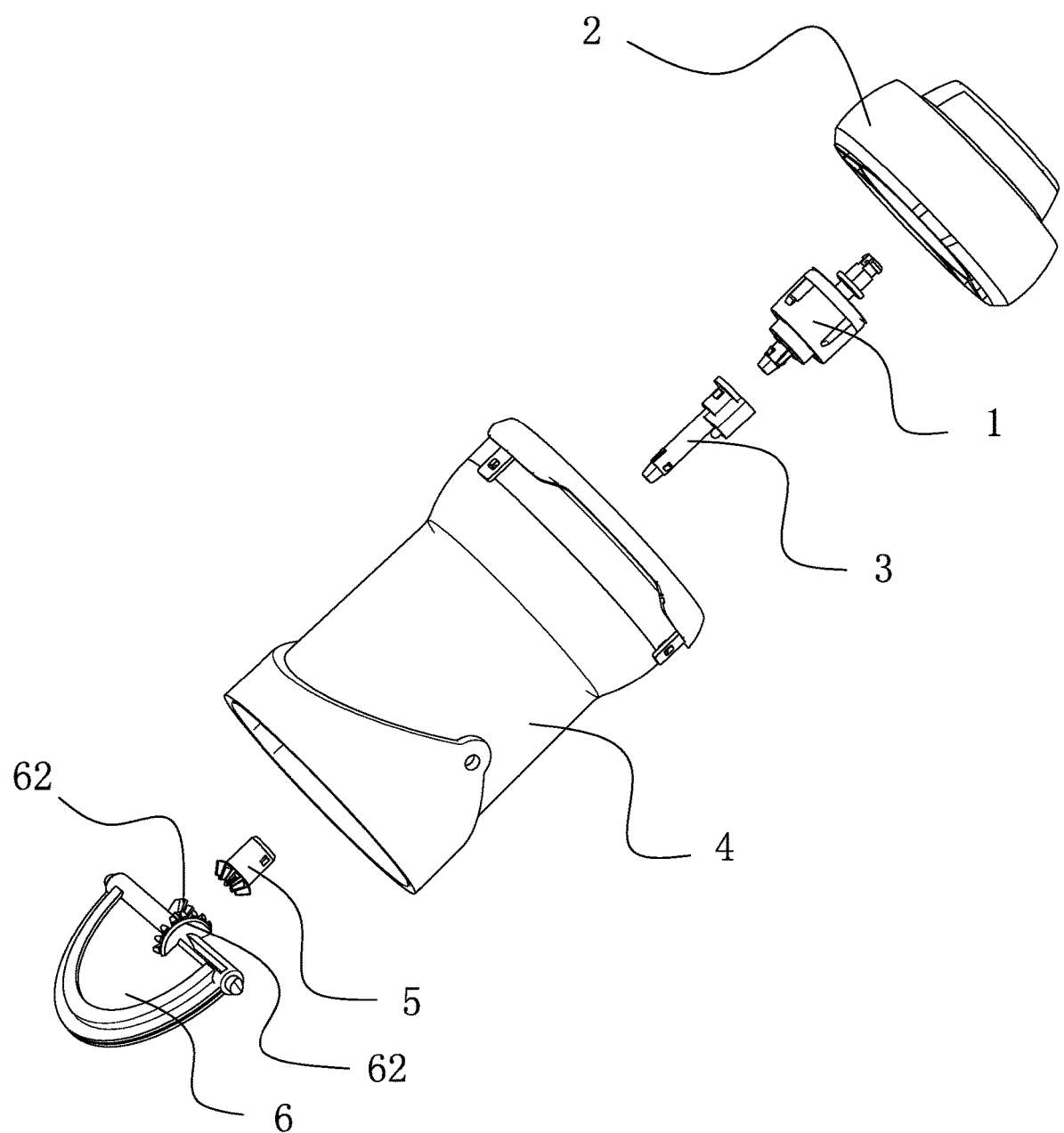
FIG. 2 is an exploded schematic diagram of a circular air conditioner vent of the present disclosure.
Figure 3:
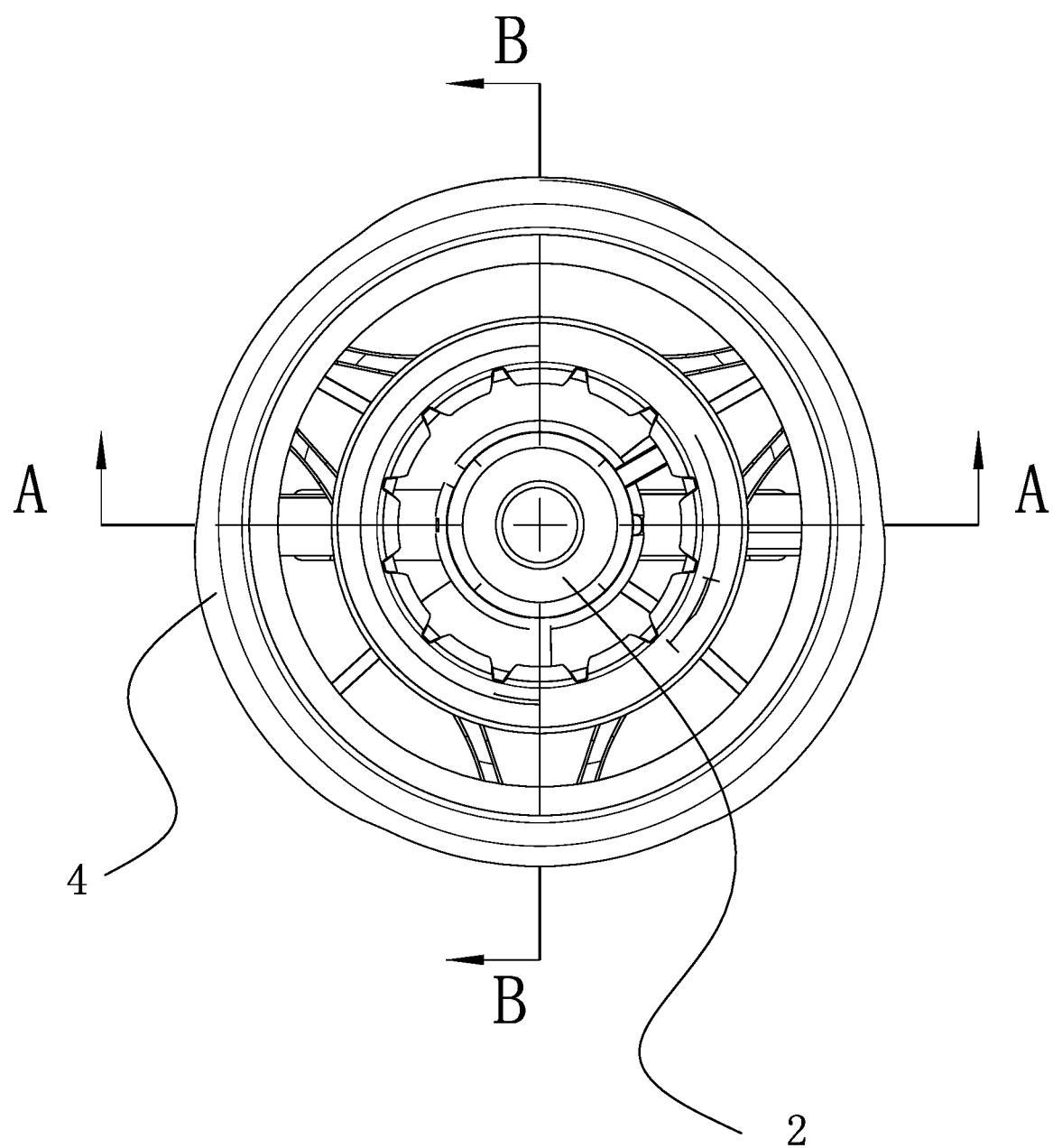
FIG. 3 is a front structural schematic diagram when using the circular air conditioner vent of the present disclosure.
Figure 4:
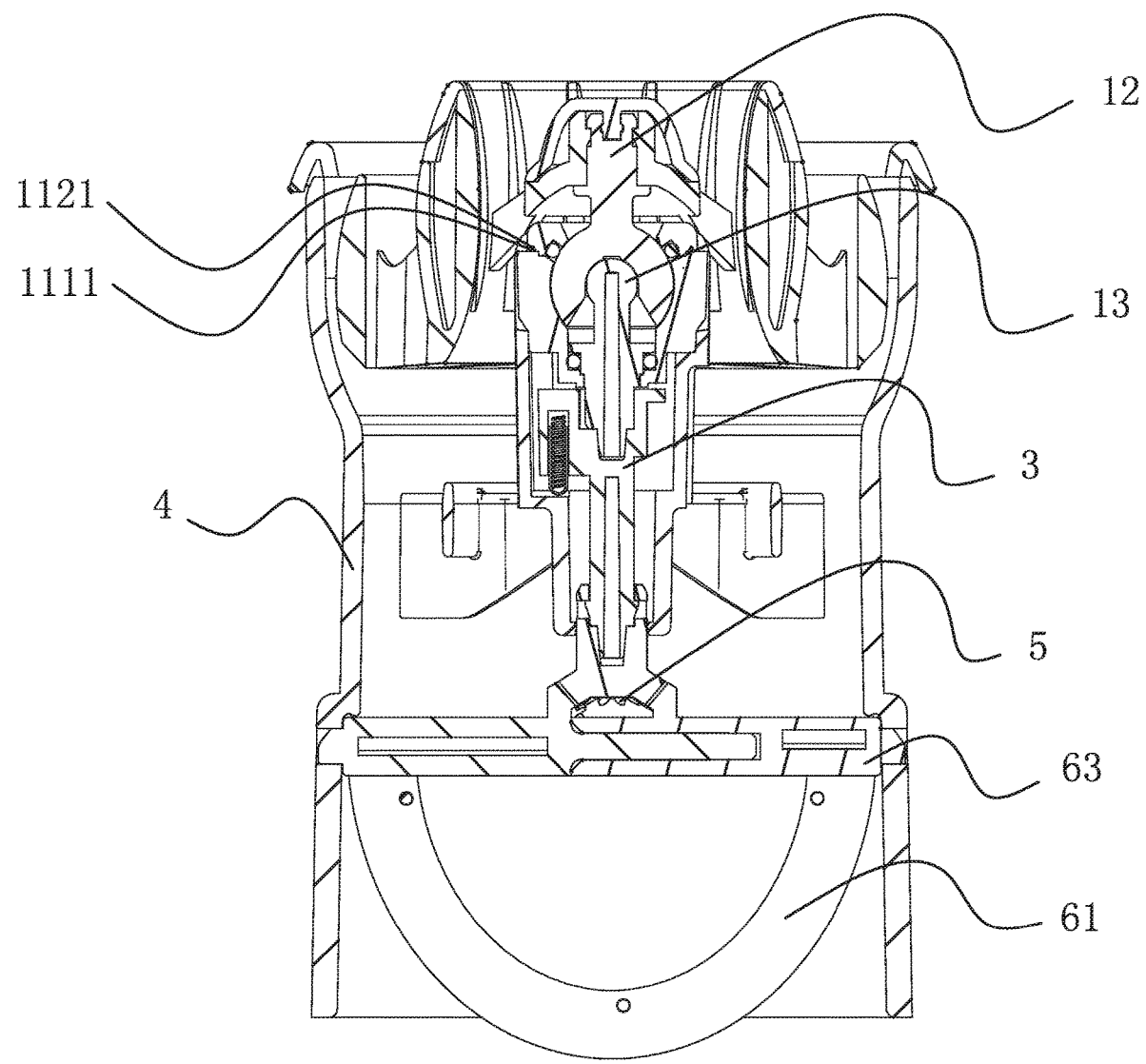
FIG. 4 is a sectional diagram showing A-A direction of the circular air conditioner vent of the present disclosure.
Figure 5:
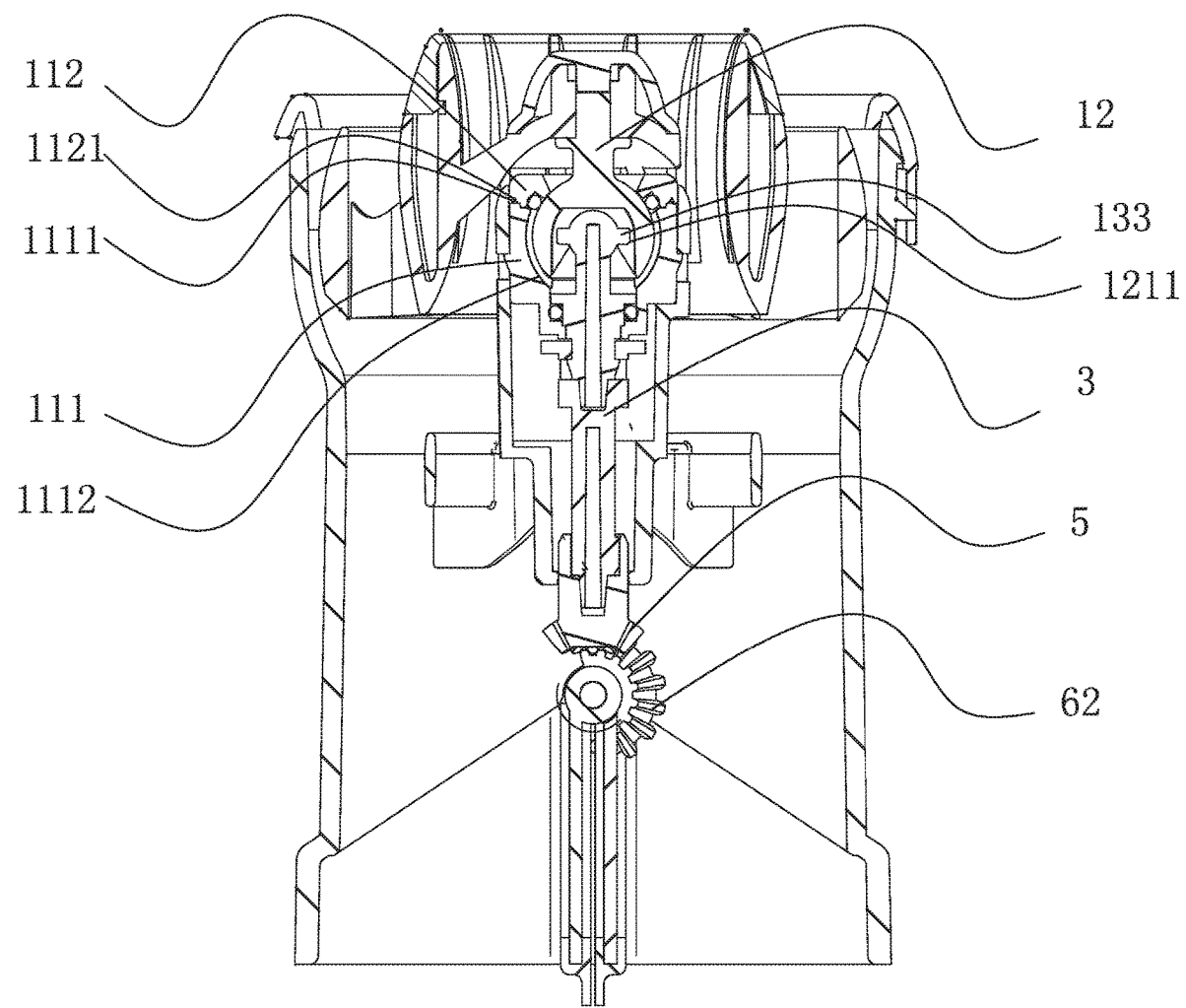
FIG. 5 is a sectional diagram showing B-B direction of the circular air conditioner vent of the present disclosure.

The present disclosure provides a multi-directional smooth damper 1, as shown in FIG. 1 to FIG. 5, includes a base 11, a first rotating portion 12, and a second rotating portion 13. The base 11 includes an inner cavity that is spherically-shaped, where two ends of the inner cavity defining openings. A first end of the first rotating portion 12 is rotatably disposed in the inner cavity of the base 11 and a shape of the first end of the first rotating portion 12 corresponds to the shape of the inner cavity of the base. A second end of the first rotating portion 12 passes through an opening of one end of the base 11. The first end of the first rotating portion 12 disposed in the base 11 has an opening and an inner cavity. A first end of the second rotating portion 13 is rotatably disposed in the inner cavity of the first rotating portion 12 and a shape of the inner cavity of the first rotating portion 12 corresponds to the shape of the first end of the second rotating portion 13. A second end of the second rotating portion 13 passes through the one opening of one end of the base 11 away from the first rotating portion 12.

At least one grease groove 1112 is disposed on a surface of the inner cavity of the base 11. The grease groove 1112 of the embodiment is formed from the opening of one end of the base 11 along the surface of the inner cavity of the base 11 to extend to an opening of the other end of the base 11. In the other embodiment, the grease groove is regarded as a groove circumferentially disposed along the surface of the inner cavity of the base 11. The grease groove 1112 is used to store grease having a viscosity and capable of generating a constant damping force. The first rotating portion 12 rotates relative to the base 11 to bring the grease of the grease groove. Thereby, a grease layer is formed between the surface of the first rotating portion 12 and the surface of the inner cavity of the base 11, and between the surface of the second rotating portion 13 and the surface of the inner cavity of the first rotating portion 12. The grease used in the grease layer is a lubricating material and a common damping material, which utilizes its lubricity and viscosity to generate a smooth and constant damping force between the two components moving relative to each other. When different components relatively rotate, the grease layer forms a thin oil film in the gap between different components. The oil film performs lubrication action when the components rotate and match each other, further making the components rotate smoothly. And the viscosity of the grease can make the components generate the constant friction to form constant damping force when rotating. The smooth and constant damping force is formed when the components are relatively rotated and matched using the above structure, and the structure is simple and convenient in assembly. Especially for the relative rotation of the first rotating portion 12 in the base 11, the grease layer forms the thin oil film in the gap between the surface of the inner cavity of the base 11 and the surface of the first rotating portion 12. The oil film performs lubrication action when the first rotating portion 12 and the base 11 rotate and match each other, further making the first rotating portion 12 rotate smoothly in the base 11. The constant friction can be generated to form constant damping force when the first rotating portion 12 rotates smoothly in the base 11 because of the viscosity of the grease. The smooth and constant damping force is formed when the first rotating portion 12 and the base 11 are relatively rotated and matched.

To be specific, the first rotating portion 12 includes a first ball 121 and a first operating shaft 122, where an end of the first operating shaft 122 is connected with the first ball 121. The first ball 121 is rotatably disposed in the inner cavity of the base 11. The first operating shaft 122 passes through the opening of the one end of the base 11. The second rotating portion 13 includes a second ball 131 and a second operating shaft 132, where an end of the second operating shaft 132 is connected to the second ball 131. The second ball 131 is rotatably disposed in the inner cavity of the first rotating portion 12, The second operating shaft 132 passes through the opening of the end of the base 11 away from the first rotating portion 12. The first operating shaft 122 drives the first ball 121 to rotate in the inner cavity of the base 11. An annular protrusion 123 and a first connecting piece 124 are disposed on an end of the first operating shaft 122 away from the base 11, a first connecting piece 124 is connected with the annular protrusion 123 and is connected to the external component. An annular protrusion 134 is disposed on an end of the second operating shaft 132 away from the base 11. A second connecting piece 135 is connected to the external component and is connected with the annular protrusion 134. In the embodiment, the first connecting piece 124 and the second connecting piece 135 are buckled to facilitate the assembly and disassembly with other components.

The base 11 provides an inner cavity that is spherically-shaped, where both ends of the inner cavity defining openings. Specifically, the base 11 includes an end cover 112 having a through hole and sealingly connected with the opening of one end of the base 11. The base 11 also includes a base body 111 with a stepped and convex shape. A ring-shaped recessed platform 1121 is disposed on the end cover 112, and is attached and connected to a ring-shaped protruded plate 1111 disposed on one end of the base body 111, where the ring-shaped protruded plate 1111 is connected with the ring-shaped recessed platform 1121 by ultrasonic welding. The first operating shaft 122 passes through the hole of the end cover 112. It should be noted that a radial width of the through hole on the end cover 112 is greater than radial width of the first operating shaft 122 to make more room for multi-directional movement of the first operating shaft 122. In order to prevent overflow of the grease, an annular seal groove is disposed along an edge of the through hole of the end cover 112, and a first sealing ring 113 is disposed in the groove. In order to obtain better sealing, the one opening of the one end of the base 11, another annular seal groove is formed at a joint position between the annular protrusion 134 of the second rotating portion 13 and the second connecting piece 135, and a second sealing ring 113 is disposed in the other groove, thereby, sealing the grease in the base 11 to effectively prevent oil leakage, which makes the damper 1 to maintain the constant damping force. The first sealing ring 113 is provided at the opening of the one end of the base 11, and the second sealing ring 113 is provided at the opening of the other end of the base 11. The inner cavity of the base 11 is sealed by the first and second sealing rings, and grease is retained in the sealed inner cavity of the base. A third connecting piece 114 is disposed on an outer surface of the base 11. The third connecting piece 114 of the embodiment is a buckle.

An ear column 133 is disposed on the second ball 131 of the embodiment. The ear column 133 of the embodiment is a columnar protrusion disposed on the surface of the second ball 131. An ear column avoidance groove 1211 is disposed in the inner cavity of the first ball 121 and is matched with the ear column 133. The first rotating portion 12 drives the second rotating portion 13 to rotate synchronously around its axis using the ear column 133. The ear column 133 is a columnar projection distributed in the second ball 131 in the non-rotational axis direction. The first rotating portion 12 drives the second rotating portion 13 synchronously around its axis by matching the ear column 133 with the ear column avoidance groove 1211. In order to achieve a better effect, a plurality of ear columns 133 respectively disposed on two or more sides in the axial direction. The ear column 133 of the embodiment is disposed in the columnar protrusion of the second ball 131 in four directions of the same horizontal plane.

Embodiment 2

The embodiment provides a circular air conditioner vent includes a housing 4, a blade 2 disposed in the housing 4, an air door 6, and a one-piece multi-directional smooth damper 1 described in the above embodiment 1. The base 11 is an independent base formed independently of the housing 4. The base 11 of the multi-directional smooth damper 1 is fixed and connected with an inner surface of the housing 4. The blade 2 is circular and rigidly connected with the first operating shaft 122 of the first rotating portion 12 of the multi-directional smooth damper 1. The first operating shaft 122 is driven by controlling the direction of blade 2. Thereby, the first rotating portion 12 is controlled to rotate around the axis or around the ball center to make a multi-directional rotational motion.

The air door 6 is rotatable and is connected with the housing 4 and is rotated by the multi-directional smooth damper 1. The air door 6 includes a rotating shaft 63 connected with the housing 4, an air door body 61 which is rotated and connected with the rotating shaft 63, and a semi-bevel gear 62 disposed on the air door body 61. The air door body 61 rotates around the rotating shaft 63 to control opening and closing of the air door 6. When the air door 6 is closed, the air door 6 can effectively shade one end of the housing 4 far away from the blade 2. Thereby, the gas is prevented from entering into the housing 4. The air volume is adjusted, namely an opening angle of the air door 6 is adjusted. Thereby, control adjustment of the air volume is achieved.

The circular air conditioner vent of the embodiment includes a connecting rod shaft 3 rigidly connected with the end of the second operating shaft 132 of the multi-directional smooth damper 1 and a bevel gear 5 rigidly connected with an end of the connecting rod shaft 3. The bevel gear 5 is meshed with the semi-bevel gear 62 disposed on the air door 6. The bevel gear 5 rotated around the axis of the connecting rod shaft 3. Thereby, the air door 6 is driven to rotate around the rotating shaft 63.

The air door 6 of the embodiment includes the rotating shaft 63 and two air door bodies 61 disposed on the rotating shaft 63. The two air door bodies 61 are unfolded in a shape corresponding to the opening of the one end of the housing 4 away from the blade 2. The semi-bevel gear 62 is staggered and disposed on position of the rotating shaft 63 corresponding to two air door bodies 61. Specifically, the housing 4 of the embodiment is a cylinder and two ends of the cylinder are open. The air door 6 includes two semicircular air door bodies 61 corresponding to the rotating shaft 63. The semi-bevel gear 62 is disposed on each of the air door bodies 61. The semi-bevel gears 62 on the two air door bodies 61 are staggered and disposed, and the shape of the two semicircular air door bodies 61 after unfolding is circular corresponding to a circular-shaped of the one end of the housing 4 away from the blade 2. The bevel gear 5 on the connecting rod shaft 3 simultaneously meshes with the semi-bevel gear 62 on the two air door bodies 61. Thereby, the two air door bodies 61 are simultaneously driven to rotate around the rotating shaft 63. Since the semi-bevel gears 62 are oppositely disposed, the two air door bodies 61 are rotated in opposite directions by the bevel gear 5.

When air door is open or closed, or the air volume is adjusted, the blade 2 is controlled to rotate around the axis. Thereby, the first rotating portion 12 is driven to rotate around the axis corresponding to the base 11. Furthermore, the second rotating portion 13 is driven to rotate around the axis via matching the ear column 133 with the ear column avoidance groove. The bevel gear 5 rotates around the axis via the connecting rod shaft 3 connected with the second rotating portion 13, and the bevel gear 5 is meshed with the semi-bevel gear 62 on the air door 6, thereby realizing that the rotating shaft 63 on the vent body 61 rotates, the opening or closing of the air door 6, or adjusting of the air volume of the air door 6 are realized.

When the direction of the air needs to adjust, since the first rotation portion 12 rotates around the ball center to make a multi-directional rotational motion, an adjustment of the direction of the air is achieved by only adjusting rotation direction of the blade 2 rotating around the ball center.

The above embodiment provides detail described of a multi-directional smooth damper and a circular air conditioner vent, and a principle and implementation mode of the present disclosure are expounded by using specific examples in this article. The above embodiment is only used to help understand the core idea of the present disclosure. At the same time, for the general technical person in this field, there will be changes in the concrete implementation mode and application scope base to the idea and method of the present disclosure. In summary, the contents of the specification should not be understood as the restriction of the present disclosure.

The invention claimed is:

1. A spherical universal joint, comprising:
 a base comprising an inner cavity that is spherically-shaped, two ends of the inner cavity defining openings;
 a first rotating portion; and
 a second rotating portion;
 wherein a first end of the first rotating portion is rotatably disposed in the inner cavity of the base and a shape of the first end of the first rotating portion corresponds to a shape of the inner cavity of the base; a second end of the first rotating portion passes through an opening of one end of the base; the first end of the first rotating portion disposed in the base has an opening and an inner cavity; a first end of the second rotating portion is rotatably disposed in the inner cavity of the first rotating portion and a shape of the inner cavity of the first rotating portion corresponds to a shape of the first end of the second rotating portion; a second end of the second rotating portion passes through an opening of an other end of the base away from the first rotating portion; at least one grease groove is disposed on a surface of the inner cavity of the base; a grease layer is coated between a surface of the first rotating portion and the surface of the inner cavity of the base;

a first sealing ring is provided at the opening of the one end of the base, a second sealing ring is provided at the opening of the other end of the base, the inner cavity of the base is sealed by the first and second sealing rings, and grease is retained in the sealed inner cavity of the base;

wherein the base comprises a base body with a stepped and a convex shape, and an end cover having a through hole and sealingly connected with an opening of one end of the base body; a ring-shaped recessed platform facing the base body is disposed on the end cover, and is attached and connected to a ring-shaped protruded plate facing the end cover and disposed on one end of the base body.

2. The spherical universal joint according to claim 1, wherein the grease groove is formed from the opening of the one end of the base along the surface of the inner cavity of the base to extend to the opening of the other end of the base.

3. The spherical universal joint according to claim 1, wherein the first rotating portion comprises a first ball and a first operating shaft; an end of the first operating shaft is connected with the first ball; the first ball is rotatably disposed in the inner cavity of the base; the first operating shaft passes through the opening of the one end of the base; the first ball comprises an opening and an inner cavity; the second rotating portion comprises a second ball and a second operating shaft; and an end of the second operating shaft is connected to the second ball; the second ball is rotatably disposed in the inner cavity of the first rotating portion; the second operating shaft passes through the opening of the other end of the base away from the first rotating portion.

4. The spherical universal joint according to claim 3, wherein an annular protrusion and a second connecting piece are disposed on the second operating shaft, the second connecting piece is connected with the annular protrusion and is connected to an external component.

5. The spherical universal joint according to claim 3, wherein an ear column is disposed on the second ball of the second rotating portion and the ear column drives the second rotating portion to rotate around its axis; an ear column avoidance groove is disposed in the inner cavity of the first rotating portion and is matched with the ear column; the first rotating portion drives the second rotating portion to rotate synchronously around the axis via matching the ear column with the ear column avoidance groove.

6. The spherical universal joint according to claim 5, wherein the ear column is a columnar projection distributed in the second ball in a non-rotational axis direction.

7. A circular air conditioner vent, comprising
a housing;
a blade disposed in the housing;
an air door; and
a spherical universal joint comprising a base with an inner cavity, a first rotating portion, and a second rotating portion;
wherein the base is an independent base formed independently of the housing;
wherein the inner cavity of the base is spherically-shaped, two ends of the inner cavity defining openings;
wherein a first end of the first rotating portion is rotatably disposed in the inner cavity of the base and a shape of the first end of the first rotating portion corresponds to a shape of the inner cavity of the base; a second end of the first rotating portion passes through an opening of one end of the base; the first end of the first rotating portion disposed in the base has an opening and an inner cavity; a first end of the second rotating portion is rotatably disposed in the inner cavity of the first rotating portion and a shape of the inner cavity of the first rotating portion corresponds to a shape of the first end of the second rotating portion; a second end of the second rotating portion passes through an opening of an other end of the base away from the first rotating portion; at least one grease groove is disposed on a surface of the inner cavity of the base; a grease layer is coated between a surface of the first rotating portion and the surface of the inner cavity of the base;

a first sealing ring is provided at the opening of the one end of the base, a second sealing ring is provided at the opening of the other end of the base, the inner cavity of the base is sealed by the first and second sealing rings, and grease is retained in the sealed inner cavity of the base;

wherein the base of the spherical universal joint is fixed and connected with an inner surface of the housing; the blade is circular and connected with the first rotating portion of the spherical universal joint; the air door is rotated and connected with the housing by the spherical universal joint.

8. The circular air conditioner vent according to claim 7, further comprising a connecting rod shaft connected with a second operating shaft of the spherical universal joint and a bevel gear connected with the connecting rod shaft; the bevel gear is meshed with a semi-bevel gear disposed on the air door.

9. The circular air conditioner vent according to claim 8, wherein the air door comprises a rotating shaft and two air door bodies disposed on the rotating shaft; the two air door bodies are unfolded in a shape corresponding to the opening of the one end of the housing away from the blade; the semi-bevel gear is staggered and disposed on a position of the rotating shaft corresponding to the two air door bodies.

10. The circular air conditioner vent according to claim 7, wherein the grease groove is formed from the opening of the one end of the base along the surface of the inner cavity of the base to extend to the opening of the other end of the base.

11. The circular air conditioner vent according to claim 7, wherein the first rotating portion comprises a first ball and a first operating shaft; an end of the first operating shaft is connected with the first ball; the first ball is rotatably disposed in the inner cavity of the base; the first operating shaft passes through the opening of the one end of the base; the first ball comprises an opening and an inner cavity; the second rotating portion comprises a second ball and a second operating shaft; and an end of the second operating shaft is connected to the second ball; the second ball is rotatably disposed in the inner cavity of the first rotating portion; the second operating shaft passes through the opening of the other end of the base away from the first rotating portion.

12. The circular air conditioner vent according to claim 11, wherein an annular protrusion and a second connecting piece are disposed on the first operating shaft; the second connecting piece is connected with the annular protrusion and is connected to an external component.

13. The circular air conditioner vent according to claim 11, wherein an ear column is disposed on the second ball of the second rotating portion and the ear column drives the second rotating portion to rotate around its axis; an ear column avoidance groove is disposed in the inner cavity of the first rotating portion and is matched with the ear column; the first rotating portion drives the second rotating portion to rotate synchronously around the axis via matching the ear column with the ear column avoidance groove.

* * * * *